United States Patent
Acharya et al.

(10) Patent No.: US 7,408,881 B2
(45) Date of Patent: Aug. 5, 2008

(54) DIFFERENTIAL DELAY CONSTRAINED ROUTING FOR VIRTUALLY-CONCATENATED DATA TRAFFIC

(75) Inventors: Swarup Acharya, New Providence, NJ (US); Pankaj Risbood, Roselle, NJ (US); Anurag Srivastava, Roselle, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 623 days.

(21) Appl. No.: 10/949,638

(22) Filed: Sep. 24, 2004

(65) Prior Publication Data

US 2006/0067235 A1 Mar. 30, 2006

(51) Int. Cl.
*H04J 1/116* (2006.01)
(52) U.S. Cl. .................... 370/238; 370/228; 709/241
(58) Field of Classification Search ......... 370/216–228, 370/238; 398/1–38; 709/241
See application file for complete search history.

(56) References Cited

U.S. PATENT DOCUMENTS

| | | | | |
|---|---|---|---|---|
| 6,111,881 | A * | 8/2000 | Soncodi | 370/395.32 |
| 6,304,549 | B1 * | 10/2001 | Srinivasan et al. | 370/230 |
| 6,735,176 | B1 * | 5/2004 | So | 370/237 |
| 7,031,256 | B2 * | 4/2006 | Hamlin et al. | 370/230 |
| 7,058,008 | B1 * | 6/2006 | Wilson et al. | 370/216 |
| 2004/0076176 | A1 * | 4/2004 | Kfir | 370/465 |

OTHER PUBLICATIONS

U.S. Appl. No. 10/446,220, filed May 28, 2003, S. Acharya et al., "Fast Restoration for Virtually-Concatenated Data Traffic."
U.S. Appl. No. 10/745,881, filed Dec. 26, 2003, S. Acharya et al., "Route Determination Method and Apparatus for Virtually-Concatenated Data Traffic."
U.S. Appl. No. 10/853,422, May 25, 2004, S. Acharya et al., "Link Delay Determination Using Virtual Concatenation."
U.S. Appl. No. 10/856,444, May 28, 2004, H.S. Nagesh et al., "Route Determination with Differential Delay Compensation for Virtually-Concatenated Data Traffic."

(Continued)

*Primary Examiner*—Ricky Ngo
*Assistant Examiner*—Dady Chery

(57) ABSTRACT

Virtually-concatenated data traffic is routed in a network comprising a plurality of nodes. For a given traffic demand to be routed from a source node to a destination node in the network, an initial candidate path set satisfying a differential delay constraint is determined by arranging a plurality of paths in order of increasing delay and selecting a particular subset of the plurality of paths as the initial candidate set. A determination is then made as to whether the initial candidate path set is able to support a bandwidth requirement of the traffic demand. If the initial candidate path set is able to support the bandwidth requirement of the traffic demand, the initial candidate path set is utilized to route the traffic demand. Otherwise, the process is repeated for one or more additional iterations, with a different candidate path set satisfying the differential delay constraint being selected for a given additional iteration by application of a sliding-window function to the plurality of paths arranged in order of increasing delay, until a different candidate path satisfying the differential delay constraint is determined to support the bandwidth requirement of the traffic demand.

17 Claims, 8 Drawing Sheets

OTHER PUBLICATIONS

J. Edmonds et al., "Theoretical Improvements in Algorithmic Efficiency for Network Flow Problems," Journal of ACM, vol. 19, No. 2, pp. 248-264, Apr. 1972.

James B. Orlin, "A Faster Strongly Polynomial Minimum Cost Flow Algorithm," Proceedings of the 20th ACM Symposium on the Theory of Computing, pp. 377-387, 1988.

G. Garg et al., "Managing Differential Delay in SONET Architectures," EE Times, pp. 1-5, Jan. 2002.

D. Karger et al., "On Approximating the Longest Path in a Graph," Algorithmica 18, pp. 1-17, 1997.

* cited by examiner

FIG. 5

INPUT:

Network $G(V,E)$, a demand of bandwidth $F$ and the maximum amount of acceptable differential delay $J$.

PROBLEM:

Given a graph $G(V,E)$ route $F$ units of flow st. differential delay $D$ of paths $\leq J$.

OUTPUT:

A set of routes for members of the VCG satisfying the differential delay $J$.

ALGORITHM:

TotalFlow = 0;
Precompute $N$ paths, $P_1, P_2, P_3,..P_N$ in the non-decreasing order of delays
For $i$ = 1, 2, ..$N$
    Consider paths $P_i$, $P_{i+1}$, ..$P_k$ where $P_k$ is the highest
    delay path such that $d_k - d_i \leq J$
    For $j$ = $i$, $i$ + 1, ..$k$
        Route the maximum amount of flow (say, $f_j$ units) on
        path $P_j$ in $G$ subject to the capacity constraints of edges.
        TotalFlow += $f_j$
        If (TotalFlow $\geq F$)
            Output the paths $P_i..P_j$ with their respective flows and
            halt.

/* Solution not found on paths $P_i..P_k$ */
    Discard the flow routed in this step.

DIFFERENTIAL DELAY CONSTRAINED ROUTING FOR VIRTUALLY-CONCATENATED DATA TRAFFIC

RELATED APPLICATIONS

The present invention is related to the inventions described in U.S. patent application Ser. No. 10/446,220, filed May 28, 2003 and entitled "Fast Restoration for Virtually-Concatenated Data Traffic," U.S. patent application Ser. No. 10/745,881, filed Dec. 26, 2003 and entitled "Route Determination Method and Apparatus for Virtually-Concatenated Data Traffic," U.S. patent application Ser. No. 10/853,422, filed May 25, 2004 and entitled "Link Delay Determination Using Virtual Concatenation," and U.S. patent application Ser. No. 10/856,444, filed May 28, 2004 and entitled "Route Determination with Differential Delay Compensation for Virtually-Concatenated Data Traffic," the disclosures of which are incorporated by reference herein.

FIELD OF THE INVENTION

The present invention relates generally to data communication networks which utilize virtual concatenation. More particularly, the invention relates to techniques for determining routes for virtually-concatenated data traffic in a manner which satisfies differential delay requirements.

BACKGROUND OF THE INVENTION

Circuit-switched network architectures, such as those based on synchronous optical network (SONET) or synchronous digital hierarchy (SDH) standards, were originally designed to support voice traffic using dedicated fixed-bandwidth connections. Although such networks are advantageous in that they incorporate substantial reliability and protection mechanisms, their primary disadvantage has been a lack of bandwidth efficiency.

Packet-switched network architectures, which include those based on asynchronous transfer mode (ATM) or Internet protocol (IP) standards, have traditionally been much better able than circuit-switched architectures to handle data traffic. Since data traffic is inherently bursty, it leads to underutilization of the fixed-bandwidth connections of conventional circuit-switched networks. Packet-switched network architectures provide the benefits of statistical multiplexing, which allows for better handling of bursty data traffic.

Recently, virtual concatenation (VC) and link capacity adjustment scheme (LCAS) protocols have been developed which allow more efficient use of the existing fixed-bandwidth connections associated with circuit-switched SONET/SDH network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node. The destination node recombines the streams to reconstruct the original VCG.

The LCAS protocol enhances the basic virtual concatenation functionality described above by allowing so-called "hitless" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

The above-cited U.S. patent applications Ser. No. 10/446,220 and Ser. No. 10/745,881 provide additional performance improvements beyond those associated with the conventional VC and LCAS protocols.

When implementing VC or LCAS related techniques, it is often necessary to provide compensation for differential delays of the diverse routes over which the various members of a VCG are transmitted. Unfortunately, providing such a capability in conventional practice typically requires that each network node be configured to include an expensive, high-speed differential delay memory. Since a given destination node may receive different diversely-routed members at different times, the differential delay memory is used to store member data until all members are received and the original data stream can be properly reconstructed.

Additional details regarding conventional aspects of differential delay compensation can be found in, for example, G. Garg et al., "Managing Differential Delay in SONET Architectures," EE Times, January 2002, which is incorporated by reference herein.

The above-cited U.S. patent application Ser. No.10/856,444 provides improved route determination techniques for virtually-concatenated data traffic, which are capable of providing desired levels of differential delay compensation in situations in which differential delay memories are incorporated into only a subset of the network nodes.

In provisioning a set of diverse routes for members of a VCG, it is important to have an accurate estimation of link delays. For example, link delay determination is essential for proper implementation of Quality of Service (QoS) in delay-sensitive applications such as voice transmission. A given provisioned VCG circuit with a non-zero differential delay will require the destination node to hold the faster arriving members in memory until the slower ones arrive. Holding these members consumes differential delay buffer space at the sink node. Since many network nodes have only a small amount of buffer memory, the onus is on the routing algorithm to ensure that the VCG circuit is not set up along routes where members will experience more differential delay than can be accommodated by the corresponding nodes. Accurate and efficient link delay determination can therefore facilitate the provisioning of diverse routes for VCG members.

The above-cited U.S. patent application Ser. No. 10/853,422 provides link delay determination techniques which utilize virtual concatenation to determine link delay. For example, link delay may be determined in a network comprising a plurality of nodes by identifying pairs of nodes associated with a given link, and, for each of the identified pairs, setting up a VCG between the nodes of that pair. The VCGs are then utilized to make delay measurements, and the delay measurements are processed to determine delay of the given link. Such delay measurements can considerably facilitate the operation of routing algorithms in the VCG provisioning context.

Despite the important advances provided by the techniques described in U.S. patent applications Ser. No. 10/853,422 and Ser. No. 10/856,444, a need remains for further improvements, particularly in terms of routing algorithms which can take differential delay constraints into account when determining routes for VCG members.

SUMMARY OF THE INVENTION

The present invention meets the above-noted need by providing improved routing algorithms for virtually-concatenated data traffic.

In accordance with one aspect of the invention, virtually-concatenated data traffic is routed in a network comprising a plurality of nodes. For a given traffic demand to be routed from a source node to a destination node in the network, an initial candidate path set satisfying a differential delay constraint is determined by arranging a plurality of paths in order of increasing delay and selecting a particular subset of the plurality of paths as the initial candidate set. The plurality of paths may be precomputed prior to arrival of the traffic demand. A determination is then made as to whether the initial candidate path set is able to support a bandwidth requirement of the traffic demand. If the initial candidate path set is able to support the bandwidth requirement of the traffic demand, the initial candidate path set is utilized to route the traffic demand. Otherwise, the process is repeated for one or more additional iterations, with a different candidate path set satisfying the differential delay constraint being selected for a given additional iteration by application of a sliding-window function to the plurality of paths arranged in order of increasing delay, until a different candidate path satisfying the differential delay constraint is determined to support the bandwidth requirement of the traffic demand. The different candidate path set is then utilized to route the traffic demand.

In an illustrative embodiment, in each of a plurality of iterations, a given candidate path set satisfying the differential delay constraint is considered. An attempt is made to route a maximum possible flow on each path of the given candidate path set until a requisite total amount of flow satisfying the bandwidth requirement of the traffic demand is routed, or capacities of all paths in the candidate set are exhausted without routing the requisite total amount of flow. More specifically, the process in a given iteration may involve starting with a smallest delay path in the candidate path set, routing a maximum amount of flow on that path, adjusting link capacities accordingly, and repeating the routing and adjusting steps for one or more additional paths of the candidate path set until the total amount of flow is routed or capacities of all paths in the candidate set are exhausted.

The plurality of paths in the illustrative embodiment may comprise N precomputed paths denoted $P_1, P_2, P_3, \ldots P_N$, arranged in order of increasing delay, with $d_i$ representing delay of path $P_i$. In an $i^{th}$ iteration, a path $P_i$ is denoted as a smallest delay path, and the sliding-window function finds a highest delay path $P'_k$ such that $d'_k - d_i \leq J$, where J denotes the differential delay constraint, the paths $P_i$ to $P'_k$ comprising the candidate set for the $i^{th}$ iteration.

In accordance with another aspect of the invention, in a given iteration, the paths of a corresponding candidate path set are rearranged in order of increasing path cost before determining if the candidate path set is able to support a bandwidth requirement of the traffic demand by routing flows on said paths.

In accordance with a further aspect of the invention, given a set of k paths, $P_1 \ldots P_k$, of a particular candidate path set, the determination as to whether the candidate path set is able to support a bandwidth requirement of the traffic demand may involve applying an integer linear program to determine a maximum flow that can be routed on the set of k paths.

Advantageously, the present invention in the illustrative embodiments provides practical, effective algorithms for determining routes for virtually-concatenated data traffic subject to differential delay constraints.

BRIEF DESCRIPTION OF THE DRAWINGS

FIG. 5 shows a set of pseudocode for an exemplary DDR algorithm utilizable in determining routes through a data transmission network, in accordance with an illustrative embodiment of the invention.

DETAILED DESCRIPTION OF THE INVENTION

The invention will be illustrated herein in conjunction with illustrative embodiments of differential delay routing (DDR) algorithms, as well as a network-based system and example network nodes in which the algorithms may be implemented. It should be understood, however, that the invention is not limited to use with the particular routing algorithms, network-based system or network node implementations described, but is instead more generally applicable to any routing application in which it is desirable to provide an improved route determination process which satisfies specified differential delay constraints.

Figure 1:
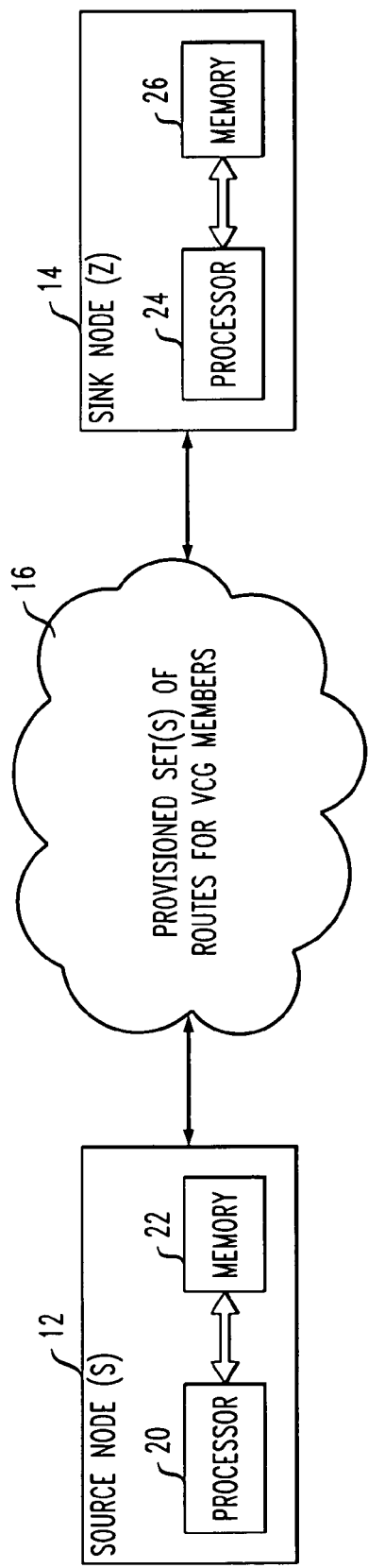
FIG. 1 illustrates a portion of a data transmission network in which the invention is implemented.

Referring now to FIG. 1, a data transmission network 10 includes a source node 12, a sink node 14, and one or more provisioned sets of routes 16 for VCG members. It is to be appreciated that the figure shows only a portion of a typical network, for simplicity and clarity of description. The network nodes 12, 14, although illustratively shown as a source-sink node pair, may comprise an ingress-egress node pair, or any other pair of network nodes.

The source and sink nodes are also denoted herein as S and Z nodes, respectively. The source node 12 includes a processor 20 coupled to a memory 22. Similarly, the sink node 14 includes a processor 24 coupled to a memory 26. The memory elements of the nodes 12, 14 store one or more software programs for execution by the corresponding processors in implementing virtual concatenation operations such as forming VCGs and determining appropriate routes for VCG members, using the above-noted G.707 and G.7042 standards documents, or other communication protocols. The conventional aspects of the operation of nodes 12, 14 in transmitting virtually-concatenated data traffic through network 10 are well known in the art and therefore will not be described in detail herein.

As disclosed in the above-cited U.S. patent application Ser. No. 10/446,220, the VCG for which a given set of routes is provisioned may comprise a plurality of primary members and at least one backup member. This is in contrast to conventional VCGs, in which each member is a primary member and there are no backup members, and considerably facilitates restoration of member traffic in the event of link failures. Further improvements in restoration may be achieved through utilization of a modified LCAS protocol as described in the above-cited U.S. patent application Ser. No. 10/446,220. It should be noted that these and other restoration techniques are not a requirement of the present invention, but may be desirable to implement in a given embodiment. The present invention can alternatively be implemented using conventional restoration techniques, or no restoration technique.

In accordance with the invention, the processors 20, 24 and associated memories 22, 26 are also used in storage and execution of one or more software programs for implementing a routing algorithm of the type to be described in greater detail below.

A number of exemplary DDR algorithms in accordance with the invention will be described below in conjunction with FIG. 5. The DDR routing problem will first be introduced with reference to the network diagrams of FIGS. 2, 3 and 4. It should be emphasized that the particular algorithms and network arrangements described in conjunction with these and other figures herein are presented by way of example, and other embodiments may utilize different routing algorithms and different network configurations.

The DDR problem may be defined in the following manner in an illustrative embodiment of the invention. Let $d_{jk}$ be the delay of the edge $(j, k) \epsilon E$. The delay $d_i$ of a path $P_i$ is then given by:

$$d_i = \sum_{(j,k) \in P_i} d_{jk}$$

Let P denote a set of paths $P_1, P_2, P_3, \ldots P_n$ returned by a routing algorithm. Let $d_{max}$ and $d_{min}$ be the delay of the highest and smallest delay paths in P, respectively. The differential delay $D_P$ of paths in P may be defined as follows:

$$D_P = d_{max} - d_{min}$$

The DDR problem may then be characterized as determining, for a given graph $G(V, E)$, whether there exist $F \epsilon Z^+$ paths of unit capacity from source node S to sink node Z, such that their differential delay $D_F \leq J$, where J denotes a differential delay constraint indicative of an acceptable differential delay.

Figure 2:
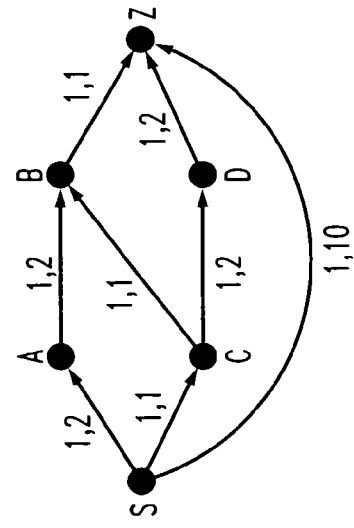
FIG. 2 shows exemplary sets of nodes and links in the FIG. 1 network.

It can be shown that the DDR problem as described above is NP-complete. Consider the problem of finding two paths from source S to destination Z such that their differential delay is zero. A "greedy" strategy of computing successive lowest delay paths may not always lead to a solution. In the example of FIG. 2, where X, Y denotes a link of capacity X units and delay Y units, choosing the shortest delay path of S-C-B-Z will only allow the second shortest delay path of S-Z to be used. The differential delay of these paths is of 9 units. However, two paths S-A-B-Z and S-C-D-Z of zero differential delay exist in the network.

We use the following construction to demonstrate the inherent hardness of the DDR problem. Consider a graph $G(V, E)$ with two special vertices s and z. Edges of G have unit cost and capacity. Now, consider the problem of finding the longest path in G. The longest path problem (LPP), described in M. R. Garey and D. S. Johnson, "Computers and Intractability," W.H. Freeman and Company, 1979, is known to be NP-complete, and may be defined as:

Does there exist a simple path in G from s to z of length K or more?

Note that a solution of LPP in graph G can have at most a cost of $|V|-1$ when a Hamiltonian path exists between s and z.

We have determined that LPP can be transformed to DDR with a polynomial function $f$ such that an instance $I \epsilon LPP$ has a "yes" answer if and only if (iff) the corresponding instance $f(I) \epsilon DDR$ has a "yes" answer. For the purpose of this transformation, we use the terms cost and delay interchangeably.

Figure 3:
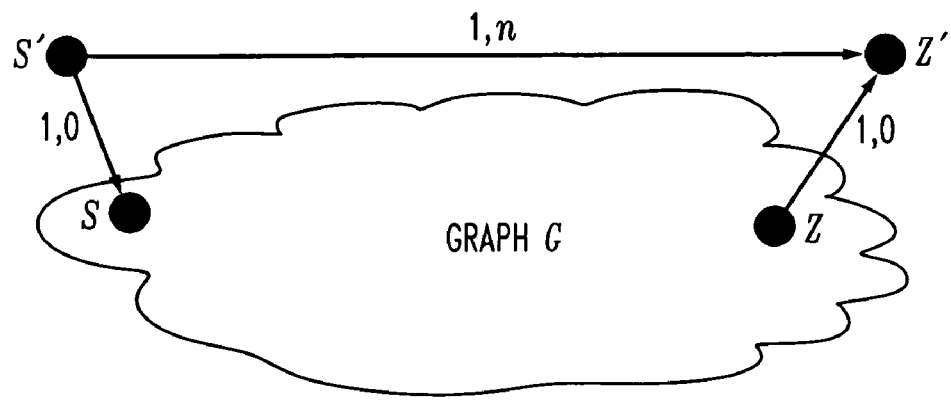
FIG. 3 illustrates the construction of a modified graph in conjunction with transformation of a longest path problem (LPP) to a differential delay routing (DDR) problem in an illustrative embodiment of the present invention.

We construct a graph $G'(V', E')$ from G where $V'=V \cup s' \cup z'$ and $E'=E \cup (s', s) \cup (z, z') \cup (s', z')$. Edges $(s',s)$, $(z, z')$ have unit capacity and zero delay whereas edge $(s', z')$ has unit capacity and n units of delay. FIG. 3 shows an example of the above-mentioned construction. In this graph G' we pose the following DDR problem:

Does there exist a pair of paths each of unit capacity from source s' to sink z' such that their differential delay $D \leq n-K$?

Any solution of a "yes" instance of the above problem will contain $(s', z')$ (say, path $P_1$) as one path. Moreover, a second path ($P_2$) will contain edge $(s', s)$, a path P from s to z and edge $(z, z')$. The differential delay of the paths $P_1$ and $P_2$ will be less than n-K iff the delay of $P_2$ is greater than K. Since the delay of edges $(s', s)$ and $(z, z')$ is zero, the previously-stated differential delay condition requires that the delay of path P be greater than K, thus solving the LPP problem in graph G.

This reduction proves that a "yes" instance of the above DDR problem will translate into a "yes" instance of the LPP problem and vice versa. It also shows that DDR is at least is as hard as the LPP problem and thus, NP-complete as well. LPP has been shown to be NP-complete both in directed as well as undirected graphs, making DDR also intractable in both class of graphs. See R. Motwani, D. Karger and G. D. S. Ramkumar, "On Approximating the Longest Paths in a Graph," Algorithmica 18, pp. 82-98, 1997, and A. Björklund, T. Husfeldt and S. Khanna, "Longest Path Approximation in Directed Graphs," Electronic Colloquium on Computational Complexity, Report No. 32, 2003.

We have also determined that DDR cannot be approximated within $n^\epsilon$ for any $\epsilon<1$ for Hamiltonian graphs. Thus, the DDR problem is not only hard to solve optimally, but it also does not admit any reasonable approximation algorithm unless P=NP. This result will be demonstrated below for the case of Hamiltonian graphs which are guaranteed to have paths of length n-1 where n (or, |V|) denotes the number of vertices in the graph. Since Hamiltonian graphs are special cases of a general graph, it suffices to say that this inapproximability result will hold for general graphs as well.

Assume that there exists an α-approximation algorithm A for some constant α>1 which solves DDR. Note that the differential delay of an α-approximation algorithm for DDR can at most be α times of the optimal differential delay. Let D be the value of differential delay of a solution returned by algorithm A. Thus, if $D_{opt}$ refers to the optimal value of differential delay, then by definition:

$$D/D_{opt} \leq \alpha.$$

Consider a scenario in which algorithm A is run on the transformed graph G' of FIG. 3. In G', differential delay D of the two paths from s' to z' will be n−d where d is the delay of the path from s to z in G. Thus we have, $$\frac{n-d}{n-d_{opt}} \leq \alpha,$$

where $d_{opt}$ is the delay of highest delay path in G. But if G is a Hamiltonian graph, then $d_{opt}$=n−1, thus we have d≧n−α. The above-cited R. Motwani et al. reference showed the hardness of finding paths longer than n−n$^\epsilon$ in Hamiltonian graphs for any $\epsilon$<1 unless P=NP, which requires that α>n$^\epsilon$. It is therefore not possible to approximate the DDR problem in Hamiltonian graphs to any constant degree and thus, constant factor approximation of DDR is NP-hard as well.

Note that the hardness reduction of LPP to DDR implicitly assumes that graph G is not an directed acyclic graph (DAG). LPP is known to be solvable in polynomial time in a DAG by modifying cost c of each edge to −c and finding the shortest path in the resulting graph. However, it turns out that DDR is much harder than LPP as DDR remains NP-hard even for DAGs. Next, we show another reduction from a known NP-complete problem, referred to as "Partition" and described in the above-cited M. R. Garey et al. reference, to demonstrate the hardness of DDR in DAGs with arbitrary link delays.

Consider the following instance of the Partition problem, where A={$\alpha_1, \alpha_2, \alpha_3, \ldots \alpha_n$}. It is desired that A be partitioned into two disjoint subsets A'⊂A and A−A' such that $$\sum_{i \in A'} a_i = \sum_{j \in A-A'} a_j.$$

Figure 4:
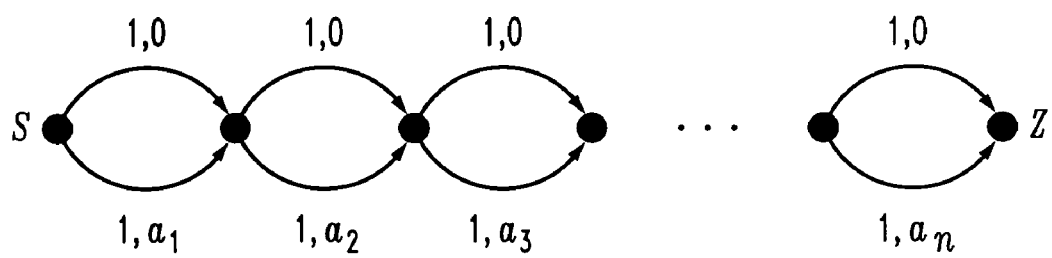
FIG. 4 illustrates the NP-completeness of a DDR problem in an illustrative embodiment of the invention.

We reduce each instance of the Partition problem into an instance of the DDR problem. Given an instance of the Partition problem, a graph G, as shown in FIG. 4 is constructed. In this graph G, the following special case of the DDR problem is posed:

Does there exist two paths of zero differential delay?

This transformation maps a "yes" instance of the Partition problem to a "yes" instance of the DDR problem and vice versa. As edge capacities are set to unity in G, two paths in G, if they exist, are guaranteed to be edge disjoint. Therefore, each edge of delay $\alpha_i$ can belong to at most one path. Moreover, each edge is also guaranteed to be used at least once by one of the paths as all the cuts in the graph are of cardinality 2. Therefore, each of the $\alpha_i$ delay edges will belong to exactly one path. Since zero differential delay implies equal total delay of the two paths, these paths directly give the desired sets A' and A−A' of the Partition problem. Thus, DDR is NP-complete even for seemingly simple DAGs.

In accordance with an aspect of the invention, routing algorithms are disclosed for solving the above-described DDR problem. Examples of such routing algorithms, also referred to herein as DDR algorithms, will be described in detail below.

As indicated earlier, differential delay is usually not an issue when a network is very lightly loaded, since a single path can be found with the requisite bandwidth. It starts to become increasingly important as the network utilization increases and the requested demand forces multiple paths to be used, either because there is not enough capacity or because a single path is not cost effective. Indeed, it is in such environments that one needs effective practical algorithms, such as those to be described below.

The hardness results presented previously indicate that solving the DDR problem is an algorithmic challenge. Moreover, since it is also provably hard to approximate well, creative solutions are necessary.

In the following, we first present the intuition behind the general solution strategy of the illustrative embodiments, and then present three example algorithms, including a basic sliding-window algorithm denoted $R_D$, a cost-based variant denoted $R_{DC}$, and an "ideal" integer linear programming (ILP) sliding-window algorithm $I_D$. Each of these algorithms utilizes N precomputed paths, and in an online phase applies a sliding window to determine a set of candidate paths known to satisfy a differential delay constraint. During the online phase, all three algorithms slide the window by at least one path after each iteration in attempting to determine if a given set of candidate paths can support the bandwidth requirement of a given traffic demand. The term "online phase" in this context refers generally to a phase that is subsequent to the precomputation phase. Typically, the online phase is initiated responsive to the arrival of a particular traffic demand to be routed from a source node to a sink node in a network.

It should be noted that a possible alternative approach to that used in the illustrative algorithms below is to address the DDR problem by splitting it into two components: a flow feasibility problem that determines if the requested traffic volume can be propagated through the network, and a path selection problem that selects the specific paths that meet the differential delay limits.

The flow feasibility problem is solvable in a straightforward manner by using a standard max-flow formulation, such as that described in R. K. Ahuja, T. L. Magnanti and J. B. Orlin, "Network Flows: Theory, Algorithms, and Applications," Prentice Hall, 1993. However, given a graph with flow on edges, extracting the necessary paths with the appropriate delays is a hard problem as well. In practice, path extraction would likely require some enumeration strategy (e.g., shortest path, widest path, etc.) which is not a scalable solution since there can be an exponential number of paths. For example, in the simple flow graph in FIG. 4, there exist two disjoint paths (or, two units of flow) between S and Z as the min-cut of the graph is two. However, there are $2^{n-1}$ ways of obtaining two edge disjoint paths. In fact, even if it were known that two paths of zero differential delay exist in FIG. 4, computation of paths will remain a NP-hard problem. Thus, solving the flow feasibility and focusing on creative path selection strategies does not appear to be a very viable plan of attack.

Instead, the approach utilized in the illustrative embodiments involves eliminating the path selection problem and focusing only on the flow feasibility problem. In other words, we translate DDR into a problem of determining if a given set of paths known to already satisfy the differential delay constraint has sufficient capacity to meet the bandwidth requirement. This may be viewed as a flow maximization problem on a given set of paths and such a problem is also known to be NP-hard, as described the above-cited M. R. Garey et al. reference. However, it is amenable to efficient heuristics and can be near-optimally solved using a linear programming (LP) formulation, or optimally solved using an ILP formulation.

In order to apply this approach effectively, one needs to find the set of paths that meet the specified differential delay limits. Consider a path $P_1$ with delay $d_1$ and a differential delay bound of δ. If $P_1$ is part of the solution, no path with delay greater than $d_1$+δ can also be part of the solution. Thus, if one were to enumerate all paths in increasing order of their delays, using a sliding window one would be able to identify the solution candidate set. The requirement would then be to determine if these paths can support the bandwidth requirement. This is the strategy we use in the example algorithms below. If the path delays are not known, link delays, and consequently path delays, can be calculated using the approach described in the above-cited U.S. patent application Ser. No. 10/853,422.

To lower the run-time costs, it is beneficial to precompute the set of paths between various source-destination pairs instead of computing such a set at the arrival of every traffic demand. Since the link and node delays typically remain substantially constant over reasonable periods of time, precomputing the paths and delays once and reusing them for multiple traffic demands is an advantageous strategy. Moreover, precomputation has the added benefit of amortizing the costs, as described in S. Acharya, B. Gupta, Y. Chang, P. Risbood and A. Srivastava, "Precomputing High Quality Routes for Bandwidth Guaranteed Traffic," Proceedings of Globecomm, Dallas, 2004. These paths should be periodically recomputed, in order to accurately reflect the state of the network and possibly to drop those paths that no longer have spare capacity. A network reorganization should also generally force a recomputation of the path set.

Basic Sliding-Window Algorithm ($R_D$)

In the basic sliding-window algorithm, also referred to herein as $R_D$, paths are pre-computed in increasing order of their delay values. Any of a number of conventional K-shortest path algorithms, with delay as the cost metric, may be used for this purpose. Such K-shortest path algorithms include, for example, those described in E. L. Lawler, "A Procedure for Computing the K best solutions to Discrete Optimization Problems and its Application to the Shortest Path Problem," Management Science, Vol. 18, pp. 401-405, March 1972, and J. Y. Yen, "Another Algorithm for Finding the K Shortest-loopless Network Paths," Proc. 41st Mtg. Operations Research Society of America, Vol. 20, p. B/185, 1972.

FIG. 5 shows a set of pseudocode for an illustrative embodiment of the basic sliding-window algorithm $R_D$. Generally, the algorithm works in an iterative manner. In each iteration, it considers a set of paths which already satisfy the differential delay constraint and tries to route the maximum amount of flow possible on each path, until it routes the specified amount of flow or exhausts the paths.

The algorithm as shown in FIG. 5 takes as input a network representation G(V, E), which generally denotes a graph G comprising a set of vertices V interconnected by edges E. The vertices and edges are also referred to herein as nodes and links, respectively. The input also includes a traffic demand of bandwidth F, and a maximum amount of acceptable differential delay J. The routing problem addressed by the FIG. 5 algorithm may be characterized as routing F units of flow in G such that the differential delay D of the paths is less than or equal to J. The output of the algorithm is a set of routes for members of the VCG carrying the demand, satisfying the differential delay constraint given by J.

Thus, the algorithm assumes that F units of flow need to be routed using paths for which the differential delay does not exceed a specified maximum amount J. Let N paths be pre-computed in increasing order of their delay values. Let $P_1$, $P_2$, $P_3$, ... $P_N$ be one such ordering. Let $d_i$ represent the delay of path $P_i$. In the first iteration, the sliding-window algorithm considers all the paths from $P_1$ to $P_k$ where $P_k$ is the path of highest delay value such that $d_k - d_1 \leq J$. In each iteration, the algorithm starts off with the smallest delay path in the set and routes the maximum amount of flow on it. After adjusting the link capacities to reflect this, it attempts the same on the remaining paths. This process is continued until the algorithm has routed the specified amount of flow or it has exhausted all the paths present in the set. In the former case, the algorithm outputs the paths with flows on them as the requisite solution. However, in the latter case, the algorithm "un-routes" all the previously routed flows and restarts with a different set of paths. In the $i^{th}$ iteration, the algorithm considers the path $P_i$ as the smallest delay path. It then finds the highest delay path $P'_k$ such that $d'_k - d_i \leq J$. It then repeats the process of routing the flows on all the paths from $P_i$ to $P'_k$.

The performance of $R_D$ is dependent upon the number of the pre-computed paths (N). For higher values of N, the likelihood of finding a solution for a specified differential delay constraint is significantly higher. However, the running time of the algorithm also goes up with N. Simulation performance results, to be described below, may be used to determine an appropriate value of N to provide satisfactory routing performance in a given application.

Note that the total bandwidth supported by k paths $P_1, \ldots, P_k$ is not the sum of the bandwidth each individual path can support. Indeed, determining the total bandwidth given such a set of k paths is a NP-hard problem, as indicated in the above-cited M. R. Garey et al. reference. This is due to the phenomenon of flow constriction where the flow on one path constricts how much flow another path can carry since they may share common links. See the above-cited S. Acharya et al. reference. Referring again to the example of FIG. 2, if the computed paths are in the order S-C-B-Z, S-A-B-Z, S-C-D-Z and S-Z, routing one unit of flow on path S-C-B-Z will constrict any flow on S-A-B-Z and S-C-D-Z even though if S-C-B-Z were not used, two units could have been supported on this network. The difficulty in accurately assigning bandwidth to each path makes this a theoretically hard problem.

In $R_D$, the heuristic we use to break the hardness is to push as much flow as possible on each path before we consider the next one. Thus, it is always possible that a solution may not be found even if one exists. The performance results provided herein indicate how this heuristic performs in practice against the "optimal" ILP algorithm $I_D$ described below. We find that for the particular example network of FIG. 6, while constriction plays a role, the performance of $R_D$ is a close match to that of the ILP algorithm.

Cost-Based Sliding-Window Algorithm ($R_{DC}$)

This algorithm is a variation of the $R_D$ algorithm. In each iteration, it considers a set of paths $P_1, P_2, \ldots P_k$ satisfying the differential delay constraint. However, instead of sequentially routing the flow in the order $P_1, P_2, \ldots P_k$, it first sorts the path in the increasing order of the cost (e.g., hops) and then attempts to route flow on them. Using the paths in sorted order of costs ensures that a solution, if found, will be more cost effective leading to better network utilization. As described earlier, use of a different ordering of paths for flow routing may affect the routing performance because of the flow constriction phenomenon. However, one can expect the algorithm to provide a lower-cost solution compared to $R_D$. The performance results to be described below indicate that $R_{DC}$ is also comparable in performance to the ILP algorithm $I_D$.

Integer Linear Programming Based Sliding-Window Algorithm ($I_D$)

An integer programming formulation can be used to address the flow constriction problem. In fact, given k paths, $P_1 \ldots P_k$, an ILP can be used to optimally determine the maximum flow that can be routed on them. However, ILPs can have very long running times and thus, one can relax the ILP to a linear program (LP) formulation. The LP solution is optimal but with fractional flow values that can be rounded to their nearest integer solution.

We provide the ILP formulation below. Given paths $P_1$, $P_2, \ldots P_N$, let $X_i$ and $x_{jk}$ denote the flow on path $P_i$ and edge (j, k), respectively, and $c_{jk}$ the capacity of the edge (j, k). Since we are only interested in integer flows of at most F units, each of the $X_i$ is required to be an integer and of at most F units. The goal of the ILP is to ensure that F units of feasible flow are found while the cost of such a solution is minimized. Thus, the objective function for the ILP is:

$$\text{minimize} \sum_{\forall (j,k) \in E} x_{jk}$$

subject to the following constraints which will ensure the feasibility of the ILP solution:

$$\sum_{k:(j,k) \in E} x_{jk} - \sum_{k:(k,j) \in E} x_{kj} = 0, \; j \in V - \{s, z\} \quad (1)$$
$$= F, \; j = s$$
$$= -F, \; j = z$$

$$0 \le x_{ij} \le c_{ij}, \; (i, j) \in E \quad (2)$$

$$x_{jk} = \sum_{i:(j,k) \in P_i} X_i \; (j, k) \in E \quad (3)$$

$$X_i \in \{0, 1, 2, \ldots F\}, \quad i = 1, 2, 3, \ldots N \quad (4)$$

Equation 1 describes the flow conservation constraint on nodes whereas Equation 2 describes the capacity constraint on edges. Equation 3 relates flow on edges to flow on the precomputed paths and Equation 4 forces the integrality constraint on the flows. Notice that the integrality constraint of Equation 4 automatically extends that constraint on $x_i$ values. Since ILP algorithms are computationally expensive, the integrality constraint of Equation 4 can be replaced by Equation 5 below:

$$0 \le X_i \le F, \; i=1, 2, 3, \ldots N \quad (5)$$

The resulting program will be a LP, which can then be efficiently solved. The fractional solution from the LP can be rounded to nearest integer using standard techniques. However, for this problem, the ILP runs extremely fast for reasonable values of differential delay and thus, we only use the ILP formulation herein.

It turns out that the DDR problem is very amenable for ILPs to be used in practice. This is because, in this environment, when the differential delay requirements are stringent (i.e., small differential delay), ILP will run the fastest as the paths in each set will be fewer in number. When the delay requirements are more loose, ILP will take longer because of the larger search space. However, in those cases an online approach such as $R_D$ or $R_{DC}$ will provide perfectly good solutions as the simulation performance results below will show.

Complexity Analysis

In this section, we present the complexity of the above described algorithms. Precomputation of N paths, which is common to all three algorithms, requires $O(NV^3)$ steps. Precomputation can be done using any standard K-shortest path algorithm, as indicated above. As indicated above, all three algorithms slide the window by at least one path after each iteration during the online phase. Thus, there are at most N iterations of the outer "for" loop. If there are k paths in each iteration, sequential routing of flow by algorithm $R_D$ will require $O(kV)$ steps. Thus, the overall complexity of the online phase of $R_D$ will be $$V \sum_{1 \le k \le N} k \text{ or } O(VN^2).$$

In each iteration, $R_{DC}$ performs an additional step of sorting the k paths based on their hops before performing the flow routing. This requires an additional $$\sum_{1 \le k \le N} k \log(k) \text{ steps,}$$

steps, such that the overall complexity of $R_{DC}$ is given by $O(N^2 \log(N) + VN^2)$. Thus, the complexity of both the algorithms $R_D$ and $R_{DC}$ is extremely low for reasonably large values of N. The overall complexity of algorithm $I_D$ depends upon the running time of the ILP. Theoretically, the worst case running time of an ILP is exponential in the number of variables. Since the introduction of a path will introduce a new variable in the ILP formulation, the complexity of the $I_D$ algorithm is of the order of $O(2^N)$. Thus, for large values of N the $I_D$ algorithm can have very high running times. But as we show in the simulation results section below, for low differential delay bounds, $I_D$ will run extremely fast even for the large values of N.

In the next section, we evaluate the performance of the $R_D$ and $R_{DC}$ algorithms against the ILP based algorithm $I_D$ on various metrics.

Performance Results

Figure 6:
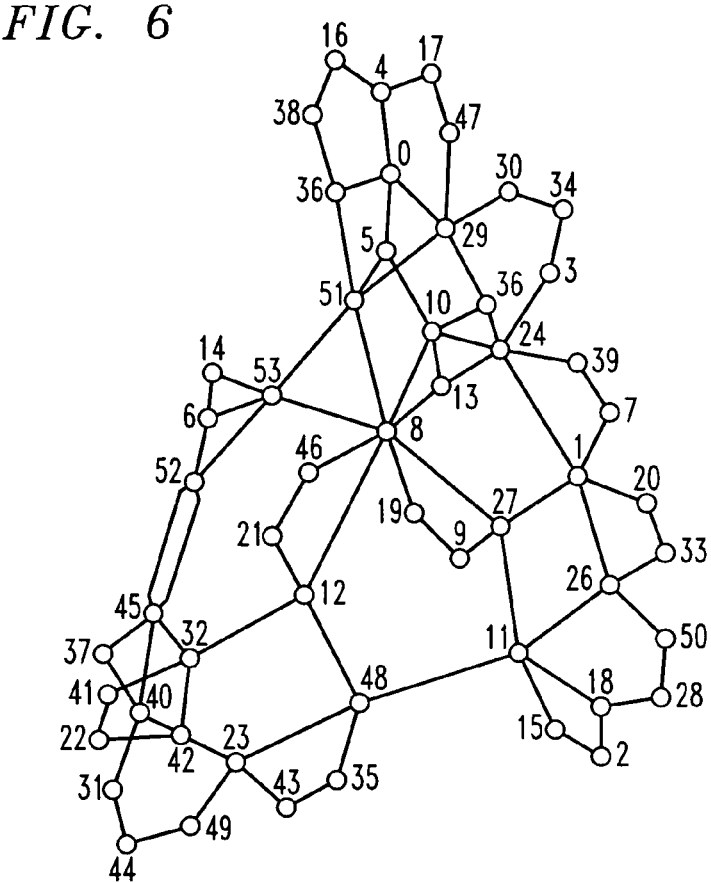
FIG. 6 shows an exemplary network topology used in simulating the performance of the DDR algorithm of FIG. 5.

In this section, we compare the performance of the three example algorithms $R_D$, $R_{DC}$ and $I_D$ described in the previous sections. The simulation is based on a network from a large North American service provider with 54 nodes and 168 links as shown in FIG. 6. Links are unidirectional with capacities of 4, 5 and 6 units and are randomly assigned a delay of 1, 2 and 5 units. All the traffic demands have the same bandwidth of 10 units so that the rejection rate performance for the different algorithms can be fairly evaluated. Note that the link capacities are chosen to be smaller than the bandwidth of the demands so that multiple paths are required for routing to create the DDR problem. The routing requests are made across 500 randomly chosen ingress-egress pairs and the number of precomputed paths between each pair of nodes (N) is 20. One request is made between each ingress-egress pair and thus, 500 in total.

Experiment 1: Rejection Rate Analysis

Figure 7:
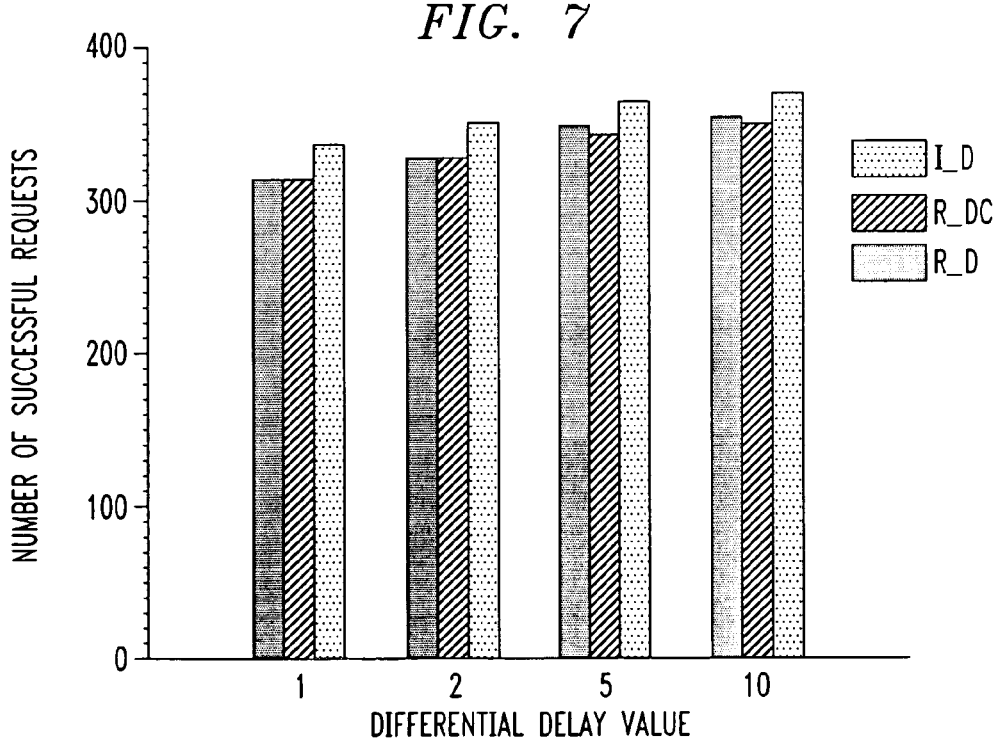
FIGS. 7, 8 and 9 show performance results of the FIG. 5 algorithm as applied to the network topology of FIG. 6.

In this experiment, we investigate the request rejection rates of the three algorithms for the various values of differential delays. Each algorithm is run for the differential delay values of 1, 2, 5 and 10 units. In each run, an ingress-egress pair is randomly chosen and a traffic demand of 10 units is made. The graph in FIG. 7 plots, for different differential delay values, the number of cases where the algorithm could successfully find the solution.

As expected, $I_D$ has the highest success rate because it avoids flow constriction by doing an exhaustive search. Both $R_D$ and $R_{DC}$ have similar numbers and are within 90% of $I_D$, a very good success ratio. Between them, $R_{DC}$ is preferable since it delivers lower-cost routes as the next experiment shows.

As the differential delay bounds become loose, $R_D$ and $R_{DC}$ come closer to the performance of $I_D$. This is to be expected as the number of candidate paths meeting delay bounds are more for larger delay values. Therefore, $R_D$ and $R_{DC}$ are more likely to avoid constriction and thereby, succeed in finding solutions.

All the algorithms fail to find routes for about a quarter of the 500 requests made. Note that if a sufficient number of paths are provided, $I_D$ is likely to find the optimal solution. In Experiment 3, we will explore the performance impact of this variable N. Suffice it to say, for high values of N, if $I_D$ fails to find a route meeting the delay bounds, one can reasonably assume that a solution does not exist. Thus, the fact that $R_D$ and $R_{DC}$ are a close match to $I_D$ reflects on the robustness of these algorithms.

Experiment 2: Solution Cost Analysis

In this experiment, we study each algorithm in terms of the cost of the routes it generates. The cost metric we use is the bandwidth-length product, which is the product of the bandwidth and the hop count for each path in the routing solution.

Figure 8:
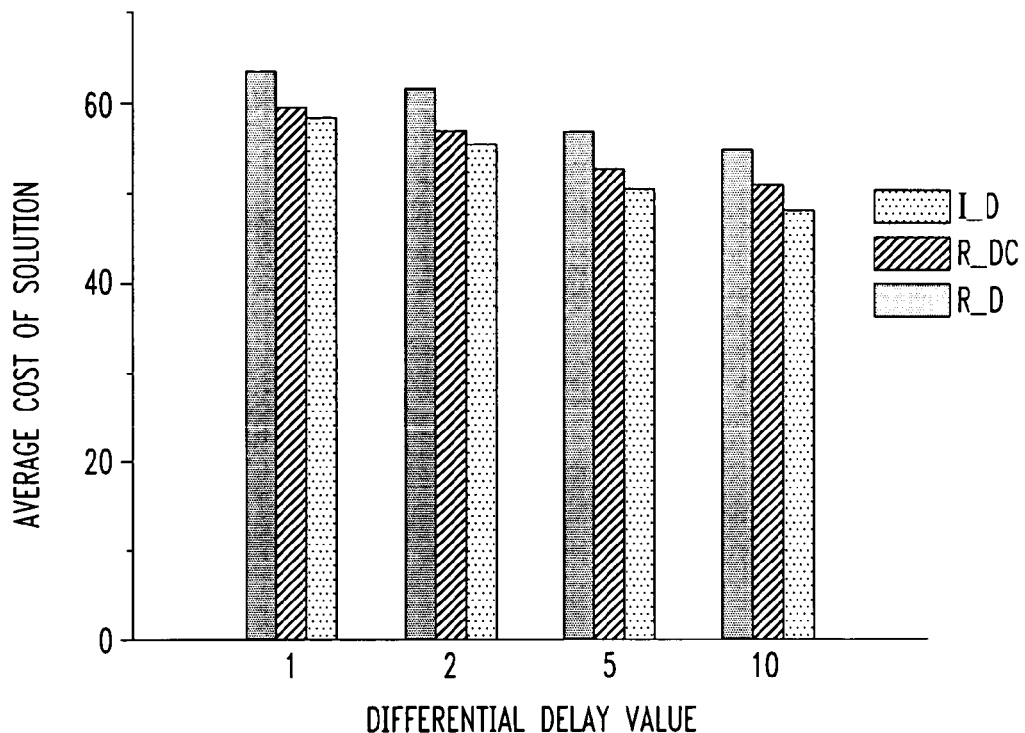

FIG. 8 shows a histogram of the average cost for the same setup as the last experiment. As expected, $I_D$ produces the cheapest paths since the ILP finds the optimal cost solution among the candidate paths. Moreover, as the delay bounds become loose, all the algorithms produce cheaper routes. This is because they have a larger set of paths in the candidate set to process. The benefit of the sorting step based on cost performed by $R_{DC}$ is clearly demonstrated here. It consistently has a close match to $I_D$'s cost and provides a significant cost improvement over $R_D$. Given that $R_{DC}$ is within 7% of $I_D$ in all the cases, will make it the algorithm of choice in many applications.

Experiment 3: Impact of Number of Paths

Figure 9:
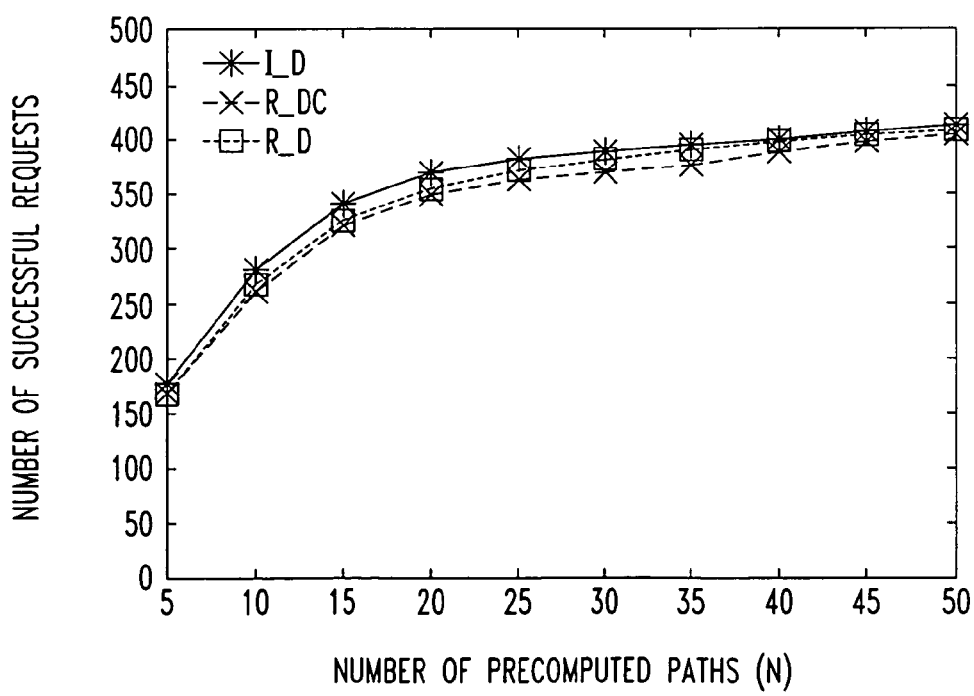

In this section, we study the effect of the number of precomputed paths (N) on the performance of the algorithms. FIG. 9 plots the routing performance of the three algorithms $R_D$, $R_{DC}$ and $I_D$ for various values of N. As is evident from the experiment, each of the three algorithms successfully routes more requests as the number of precomputed paths are increased. An increase of N from 5 to 20 shows significant ($\geq 100\%$) impact on routing performance. However, the improvement tapers off once N is raised beyond 20 ($\approx 11\%$-16% when N is raised from 20 to 50).

This raises a question about an ideal choice for the value of N which would give a satisfactory routing performance without a significant overhead. Note that a large N impacts both the precomputation phase and the run-time phase. For a network topology such as that of FIG. 6, a value of N of about 20 to 25 provides an excellent cost-benefit tradeoff. Of course, other values may be used, and an appropriate value for a given implementation can be determined in a straightforward manner by one skilled in the art.

The above results demonstrate that $R_{DC}$ is indeed a practical, effective algorithm for the DDR problem. It is a close match to the "ideal" $I_D$ performance without any of its high run-time overhead. For small delay cases, $I_D$ is a practical choice. This is because in these cases, only a few paths get selected for the candidate set and even the exhaustive search done by the ILP solver terminates soon enough to make it effective in practice.

The performance results for the $R_D$ and $R_{DC}$ algorithms demonstrate the efficacy of the strategy of attacking the DDR problem as a flow feasibility problem. By eliminating the difficulty in selecting routes within the delay bound, this strategy has made the DDR problem tractable.

The routing algorithms described above should be viewed as illustrative examples of routing algorithms in accordance with the invention, and it is to be appreciated that the invention can be implemented using other types of routing algorithms. The algorithms can be implemented in a distributed manner, in a centralized manner, or using a hybrid combination of distributed and centralized implementation, and the invention is not restricted in this regard.

A given one of the routing algorithms described above, as well as any associated restoration technique, may be implemented in a network-based system comprising a plurality of network nodes. Exemplary network and network node implementations of the invention will now be described with reference to FIGS. 10, 11 and 12.

Figure 10:
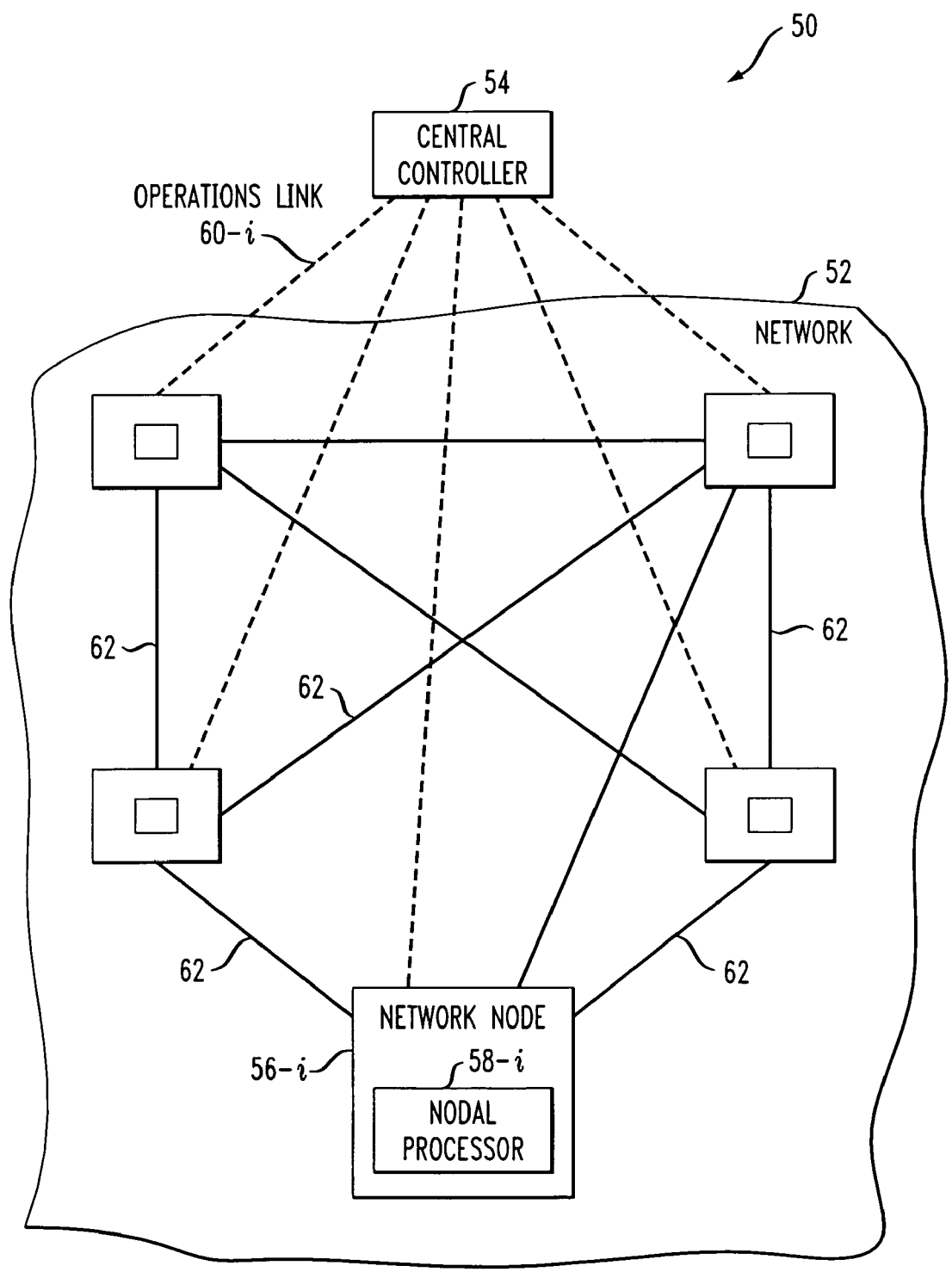
FIG. 10 shows an example network-based system in which a routing algorithm in accordance with the invention is implemented.

FIG. 10 shows an exemplary network-based system 50 in which techniques of the present invention can be implemented. The system 50 includes a network 52 and a central controller 54. The network 52 may comprise, by way of example, an Internet protocol (IP)-optical wavelength division multiplexed (WDM) mesh network, although the invention may be utilized with any type of network. The network 52 includes a number of nodes 56-i, i=1, 2, ... N. Each of the nodes 56-i includes a corresponding nodal processor 58-i. The nodes 56-i of network 52 are interconnected by, for example, optical fiber connections 62. In this example, each of the nodes 56-i has a fiber connection to three other nodes. Each of the nodes 56-i is also connected to the central controller 54 via a corresponding operations link 60-i, shown as a dashed line in FIG. 10.

The central controller 54 and nodes 56-i may each represent a computer, server, router, gateway or other suitable digital data processor programmed to implement at least a portion of a routing algorithm in accordance with the present invention.

It should be noted that the system of FIG. 10 is considerably simplified for purposes of illustration. The invention is well suited for use in large-scale regional, national and international networks which may include many subnetworks, each having hundreds of nodes.

The central controller 54 may or may not participate in route determination or associated restoration techniques, depending upon the particular implementation. For example, a fully distributed implementation need not utilize the central controller 54.

Figure 11:
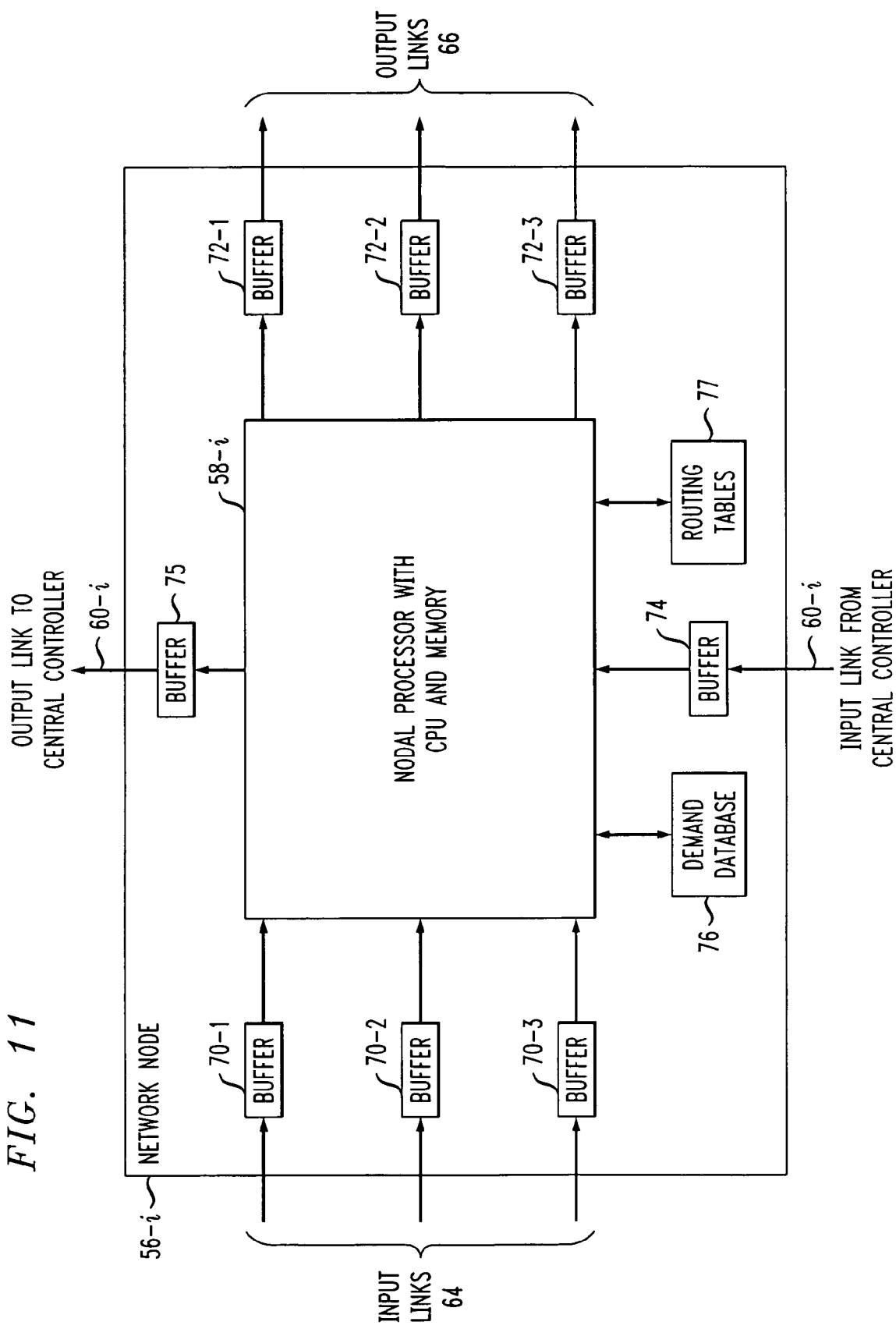
FIGS. 11 and 12 show examples of different possible implementations of a given network node in the FIG. 10 system.

FIG. 11 shows one of the nodes 56-i of network 52 in greater detail. The node 56-i includes a nodal processor 58-i which includes a central processing unit (CPU) and memory. A set of input links 64, corresponding to fiber connections 62 with three other nodes, are connected to buffers 70-1, 70-2 and 70-3 in node 56-i. The node 56-i supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

The operational link 60-i of node 56-i to the central controller 54 includes an input operational link which is coupled to nodal processor 58-i via an input buffer 74, and an output operational link which receives signals from nodal processor 58-i via an output buffer 75. The node 56-i also includes a demand database 76 for storing demands for network capacity, and a set of routing tables 77 which specify routes through the network for particular demands. The demand database 76 and routing tables 77 may be components of a common memory within node 56-i, and may be combined with or otherwise associated with the memory of nodal processor 58-i. The node 56-i has been simplified for purposes of illustration, and as noted above may include a substantially larger number of input and output links, as required for a given application.

Figure 12:
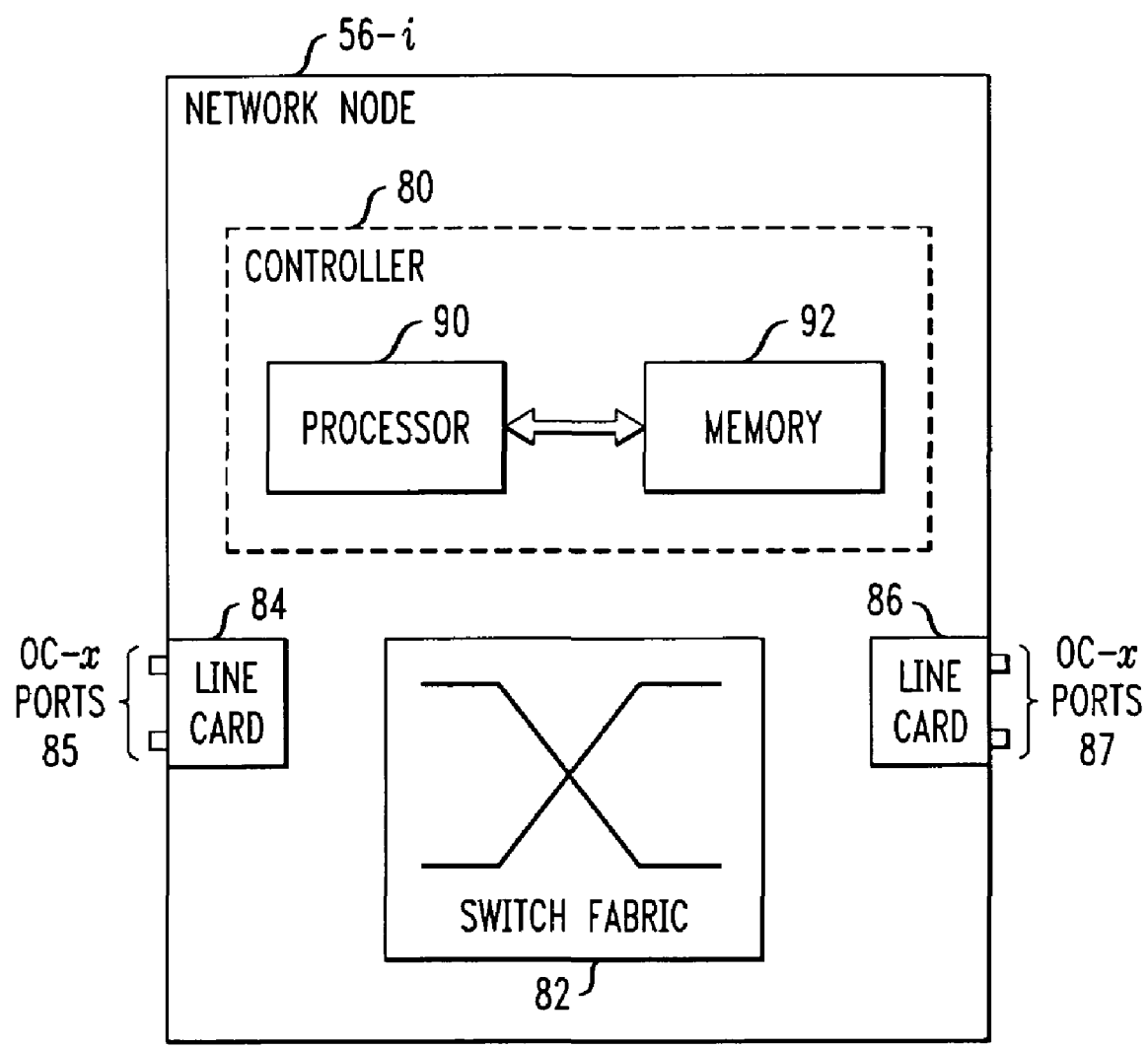

FIG. 12 shows another exemplary implementation of a given one of the network nodes 56-i of the FIG. 10 network-based system.

The network node 56-i in this example includes a controller 80, a switch fabric 82, a first line card 84 having a set of OC-x ports 85 associated therewith, and a second line card 86 having a set of OC-x ports 87 associated therewith. It should be understood that the node 56-i has again been simplified for purposes of illustration. For example, the node 56-i as shown in FIG. 12 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands, with the routes being determined at least in part using a routing algorithm of the present invention.

As indicated previously, the node 56-i may be an element of an optical network or other type of network which includes a very large number of nodes, and possibly a central controller. One or more of the nodes and the central controller may each represent a computer, processor-based switch or other type of processor-based device configured to provide routing and associated restoration in accordance with the invention.

The implementations described in conjunction with FIGS. 10, 11 and 12 are presented by way of example, and it is to be appreciated that the invention can be implemented in numerous other applications.

The above-described embodiments of the invention are intended to be illustrative only. For example, the techniques of the invention may be applied to any routing application, without regard to the type, arrangement or configuration of the network, network nodes, or communication protocols.

For example, although described in the context of virtually-concatenated EoS data traffic, the example routing algorithms described herein can be modified in a straightforward manner so as to be applicable to a wide variety of other types of data traffic. The term "data traffic" as used herein is not intended to be limited with regard to information type, and may include any type of data, including, for example, digital audio, video, speech or other information signals, in any combination.

Also, in alternative embodiments the particular steps utilized in a given routing algorithm may be varied from those steps shown in the foregoing example routing algorithms.

These and numerous other alternative embodiments within the scope of the following claims will be readily apparent to those skilled in the art.

We claim:

1. A method of routing virtually-concatenated data traffic in a network comprising a plurality of nodes, the method comprising, for a given traffic demand to be routed from a source node to a destination node in the network, the steps of:

determining an initial candidate path set satisfying a differential delay constraint by arranging a plurality of paths in order of increasing delay and selecting a particular subset of the plurality of paths as the initial candidate set;

determining if the initial candidate path set is able to support a bandwidth requirement of the traffic demand;

if the initial candidate path set is able to support the bandwidth requirement of the traffic demand, utilizing the initial candidate path set to route the traffic demand; and otherwise repeating the determining steps for one or more additional iterations, with a different candidate path set satisfying the differential delay constraint being selected for a given additional iteration by application of a sliding-window function to the plurality of paths arranged in order of increasing delay, until a different candidate path satisfying the differential delay constraint is determined to support the bandwidth requirement of the traffic demand, and utilizing that candidate path set to route the traffic demand;

wherein if the initial candidate path set includes a path $P_1$ with delay $d_1$, and the differential delay constraint is given by $\delta$, only those of the ordered plurality of paths having delays less than or equal to $d_1 + \delta$ are selected as members of the initial candidate path set.

2. The method of claim 1 wherein the candidate path set utilized to route the demand comprises a separate path for each of a plurality of members of a virtually-concatenated group.

3. The method of claim 1 wherein at least a subset of the plurality of paths are precomputed prior to arrival of the traffic demand.

4. The method of claim 1 wherein in each of a plurality of iterations, a given candidate path set satisfying the differential delay constraint is considered and an attempt is made to route a maximum possible flow on each path of the given candidate path set until a requisite total amount of flow satisfying the bandwidth requirement of the traffic demand is routed or capacities of all paths in the candidate set are exhausted without routing the requisite total amount of flow.

5. The method of claim 1 wherein the step of determining if a given candidate path set is able to support a bandwidth requirement of the traffic demand in a given iteration comprises starting with a smallest delay path in the candidate path set, routing a maximum amount of flow on that path, adjusting link capacities accordingly, and repeating the routing and adjusting steps for one or more additional paths of the candidate path set until a requisite total amount of flow satisfying the bandwidth requirement of the traffic demand is routed or capacities of all paths in the candidate set are exhausted without routing the requisite total amount of flow.

6. The method of claim 1 wherein in a given iteration, the paths of a corresponding candidate path set are rearranged in order of increasing path cost before determining if the candidate path set is able to support a bandwidth requirement of the traffic demand by routing flows on said paths.

7. The method of claim 1 wherein at least one of the determining steps is implemented at least in part in software running on a processor of a node or other element of the network.

8. A method of routing virtually-concatenated data traffic in a network comprising a plurality of nodes, the method comprising, for a given traffic demand to be routed from a source node to a destination node in the network, the steps of:
   determining an initial candidate path set satisfying a differential delay constraint by arranging a plurality of paths in order of increasing delay and selecting a particular subset of the plurality of paths as the initial candidate set;
   determining if the initial candidate path set is able to support a bandwidth requirement of the traffic demand;
   if the initial candidate path set is able to support the bandwidth requirement of the traffic demand, utilizing the initial candidate path set to route the traffic demand; and
   otherwise repeating the determining steps for one or more additional iterations, with a different candidate path set satisfying the differential delay constraint being selected for a given additional iteration by application of a sliding-window function to the plurality of paths arranged in order of increasing delay, until a different candidate path satisfying the differential delay constraint is determined to support the bandwidth requirement of the traffic demand, and utilizing that candidate path set to route the traffic demand;
   wherein the plurality of paths comprises N precomputed paths denoted $P_1, P_2, P_3, \ldots P_N$, and arranged in order of increasing delay, with $d_i$ representing delay of path $P_i$.

9. The method of claim 8 wherein in an $i^{th}$ iteration, a path $P_i$ is denoted as a smallest delay path, and the sliding-window function finds a highest delay path $P'_k$ such that $d'_k - d_i \leq J$, where J denotes the differential delay constraint, the paths $P_i$ to $P'_k$ comprising the candidate set for the $i^{th}$ iteration.

10. A method of routing virtually-concatenated data traffic in a network comprising a plurality of nodes, the method comprising, for a given traffic demand to be routed from a source node to a destination node in the network, the steps of:
   determining an initial candidate path set satisfying a differential delay constraint by arranging a plurality of paths in order of increasing delay and selecting a particular subset of the plurality of paths as the initial candidate set;
   determining if the initial candidate path set is able to support a bandwidth requirement of the traffic demand;
   if the initial candidate path set is able to support the bandwidth requirement of the traffic demand, utilizing the initial candidate path set to route the traffic demand; and
   otherwise repeating the determining steps for one or more additional iterations, with a different candidate path set satisfying the differential delay constraint being selected for a given additional iteration by application of a sliding-window function to the plurality of paths arranged in order of increasing delay, until a different candidate path satisfying the differential delay constraint is determined to support the bandwidth requirement of the traffic demand, and utilizing that candidate path set to route the traffic demand;
   wherein, given a set of k paths, $P_1 \ldots P_k$, of a particular candidate path set, the step of determining if the candidate path set is able to support a bandwidth requirement of the traffic demand comprises applying an integer linear program to determine a maximum flow that can be routed on the set of k paths.

11. The method of claim 10 wherein $X_i$ and $x_{jk}$ denote flow on path $P_i$ and edge (j, k), respectively, $c_{jk}$ denotes capacity of edge (j, k), and the integer linear program has an objective function given by:

$$\text{minimize} \sum_{\forall (j,k) \in E} x_{jk},$$

where E denotes a set of edges in a representation of the network, subject to constraints including a flow conservation constraint on nodes, a capacity constraint on edges, a constraint relating flow on edges to flow on paths, and an integrality constraint on $X_i$.

12. The method of claim 11 wherein the integrality constraint is given by:

$$0 \leq X_i \leq F,\ i=1, 2, 3, \ldots N,$$

where N denotes the number of paths in the plurality of paths and F denotes a total amount of flow satisfying the bandwidth requirement of the traffic demand.

13. An apparatus for use in routing virtually-concatenated data traffic in a network comprising a plurality of nodes, the apparatus comprising:
   a processor; and
   a memory coupled to the processor;
   wherein the processor is operative, for a given traffic demand to be routed from a source node to a destination node in the network, to perform the steps of:
   determining an initial candidate path set satisfying a differential delay constraint by arranging a plurality of paths in order of increasing delay and selecting a particular subset of the plurality of paths as the initial candidate set;
   determining if the initial candidate path set is able to support a bandwidth requirement of the traffic demand;
   if the initial candidate path set is able to support the bandwidth requirement of the traffic demand, utilizing the initial candidate path set to route the traffic demand; and
   otherwise repeating the determining steps for one or more additional iterations, with a different candidate path set satisfying the differential delay constraint being selected for a given additional iteration by application of a sliding-window function to the plurality of paths arranged in order of increasing delay, until a different candidate path satisfying the differential delay constraint is determined to support the bandwidth requirement of the traffic demand, and utilizing that candidate path set to route the traffic demand;
   wherein if the initial candidate path set includes a path $P_1$ with delay $d_1$, and the differential delay constraint is given by $\delta$, only those of the ordered plurality of paths having delays less than or equal to $d_1 + \delta$ are selected as members of the initial candidate path set.

14. The apparatus of claim 13 wherein the apparatus is implemented in a distributed manner within one or more of the network nodes.

15. The apparatus of claim 13 wherein the apparatus is implemented in a centralized manner utilizing a central controller.

16. The apparatus of claim 12 wherein in each of a plurality of iterations, a given candidate path set satisfying the differential delay constraint is considered and an attempt is made to route a maximum possible flow on each path of the given candidate path set until a requisite total amount of flow satisfying the bandwidth requirement of the traffic demand is routed or capacities of all paths in the candidate set are exhausted without routing the requisite total amount of flow.

17. An article of manufacture comprising a machine-readable medium storing one or more programs for use in routing virtually-concatenated data traffic in a network comprising a plurality of nodes, the one or more programs when executed in a processor, for a given traffic demand to be routed from a source node to a destination node in the network, performing the steps of:

determining an initial candidate path set satisfying a differential delay constraint by arranging a plurality of paths in order of increasing delay and selecting a particular subset of the plurality of paths as the initial candidate set;

determining if the initial candidate path set is able to support a bandwidth requirement of the traffic demand;

if the initial candidate path set is able to support the bandwidth requirement of the traffic demand, utilizing the initial candidate path set to route the traffic demand; and otherwise repeating the determining steps for one or more additional iterations, with a different candidate path set satisfying the differential delay constraint being selected for a given additional iteration by application of a sliding-window function to the plurality of paths arranged in order of increasing delay, until a different candidate path satisfying the differential delay constraint is determined to support the bandwidth requirement of the traffic demand, and utilizing that candidate path set to route the traffic demand;

wherein if the initial candidate path set includes a path $P_1$ with delay $d_1$, and the differential delay constraint is given by $\delta$, only those of the ordered plurality of paths having delays less than or equal to $d_1+\delta$ are selected as members of the initial candidate path set.

* * * * *